United States Patent Office 3,625,729
Patented Dec. 7, 1971

3,625,729
DISCONTINUOUS POLYCARBONATE COATINGS
Thomas S. Grabowski, Vienna, W. Va., assignor to
Borg-Warner Corporation, Chicago, Ill.
No Drawing. Filed June 12, 1968, Ser. No. 736,255
Int. Cl. B44d 5/00
U.S. Cl. 117—37                                 3 Claims

ABSTRACT OF THE DISCLOSURE

A method of making a discontinuous polycarbonate coating on a thermoplastic substrate comprising the steps of dissolving a polycarbonate resin in a solvent containing at least some developing solvent, applying the polycarbonate-solvent solution to the thermoplastic substrate to form a coating and evaporating the solvent from said polycarbonate coating to thereby form a discontinuous coating surface.

BACKGROUND

There have been a great variety of paintable coating compositions provided which have utilized a variety of polymeric materials as the continuous surface therein. The compositions normally provided an aesthetic appearance through the use of a pigment, dye or the like that was added to change the hue or color of the coating composition. Generally, the surfaces were continuous, i.e., did not shrink or expand and the usefulness of the coating was measured by its dimensional stability. Coatings that lacked dimensional stability tended to crack and peel and failed to adhere to a given substrate. In specific instances, however, a discontinuous surface was intentionally obtained by utilizing coating compositions containing various additives.

SUMMARY OF THE INVENTION

The present invention is directed to a method of making a discontinuous coating that has excellent adhering qualities comprising the steps of dissolving a polycarbonate resin in the presence of a solvent containing at least a portion of a developing solvent to provide a coating composition, applying the coating composition to a thermoplastic substrate and evaporating the solvents from said coating composition to thereby cause the coating to take a discontinuous form.

The coating composition contains a developing solvent (hereinafter defined), alone or mixed with a true solvent (hereinafter defined) to provide a coating that will take a discontinuous form upon removal of the solvent. The solvent that is referred to as a "developing solvent" does not completely dissolve the polycarbonate and is utilized in swelling the polycarbonate resin. This solvent is meant to include such solvents as styrene, substituted styrene, aromatics, ketones, alcohols and the like. The "true solvents" for polycarbonates are compounds such as tetrahydrofuran and the partially halogenated hydrocarbons.

The discontinuous coatings may be applied to virtually any thermoplastic substrate; however, it is preferred that the coatings be applied to a thermoplastic substrate such as polymers, copolymers or graft polymers prepared from monomers such as butadiene, isoprene, styrene, alpha-methylstyrene, acrylonitrile, methacrylonitrile, methyl methacrylate, ethyl acrylate, vinyl chloride, mixtures thereof and the like. Polyesters, polysulfones, polysulfonates and polyphenylene oxides may also be used as the thermoplastic substrate. The dimensional changes that take place as the solvent evaporates from the system causes the composition to form a discontinuous film and the surface takes a mottled or alligator finish. The aesthetic effects of the discontinuous coating may be changed by the addition of various dyes and/or pigments to the basic polycarbonate resin coating composition.

The specific polycarbonate resins that may be utilized to prepare the coatings of this invention are preferably the aromatic polycarbonates prepared by reacting a bisphenol such as bisphenol-A (2,2-bis-(4-hydroxyphenyl)-propane) with phosgene; however, other substituted bisphenols such as 2,2-bis-(3,5-dichloro-4-hydroxyphenyl)-propane may also be used to prepare the polycarbonates of this invention.

The specific solvents that may be utilized as well as other aspects of this invention, will be more clearly understood in view of the following examples in which all parts are by weight unless otherwise indicated.

EXAMPLE 1

A polycarbonate prepared from bisphenol-A reacted with phosgene was placed in solution by ball milling 5 parts by weight of the polycarbonate resin and 95 parts by weight of styrene for twelve hours at 21° C. using a paint ball mill. The resulting coating solution contained suspended swelled polycarbonate. This coating was applied to a panel of acrylonitrile-butadiene-styrene graft polymer thermoplastic. The coating was dried and the coating shrunk sufficiently to leave an aesthetically pleasing discontinuous coating.

EXAMPLES 1–42

A discontinuous coating effect was obtained by preparing blends of true solvents with developing solvents to dissolve the polycarbonate resin as well as with the developing solvent by itself. In each case, the polycarbonate was prepared by reacting bisphenol-A with phosgene. Varying patterns were obtained using the solvent

TABLE 1

| | "Solution" (percent by weight) | | | | Solvent composition (percent by volume) | | | | |
|---|---|---|---|---|---|---|---|---|---|
| Example | Thermoplastic substrate | Poly-carbonate | Solvent | Styrene | Methylene chloride | Chloroform | Ethylene dichloride | 1,1,2,2-tetra-chloroethane | Tetrahydrofuran |
| 2 | ABS graft polymer | 2 | 98 | 100 | | | | | |
| 3 | do | 10 | 90 | 100 | | | | | |
| 4 | do | 15 | 85 | 100 | | | | | |
| 5 | do | 19 | 81 | 100 | | | | | |
| 6 | Poly(methyl-methacrylate) | 5 | 95 | 100 | | | | | |
| 7 | Polystyrene | 5 | 95 | 100 | | | | | |
| 8 | Styrene-acrylonitrile copolymer | 5 | 95 | 100 | | | | | |
| 9 | Polysulfone | 5 | 95 | 100 | | | | | |
| 10 | Styrene-methyl methacrylate copolymer | 5 | 95 | 100 | | | | | |
| 11 | ABS graft | 5 | 95 | 30 | 70 | | | | |
| 12 | do | 5 | 95 | 50 | 50 | | | | |
| 13 | do | 5 | 95 | 70 | 30 | | | | |
| 14 | do | 5 | 95 | 30 | | 70 | | | |
| 15 | do | 5 | 95 | 50 | | 50 | | | |
| 16 | do | 5 | 95 | 70 | | 30 | | | |
| 17 | do | 5 | 95 | 50 | | | 50 | | |
| 18 | do | 5 | 95 | 50 | | | | 50 | |
| 19 | do | 5 | 95 | 50 | | | | | 50 |
| 20 | Poly(vinyl chloride) | 5 | 95 | 50 | | | | | 50 |

TABLE 2

| Ex. | Thermoplastic substrate | Polycarbonate | Solvent | Alpha-methyl styrene | Divinyl-benzene | Methyl benzoate | Benzene | Toluene | Xylene | Methyl ethyl ketone | Methyl isobutyl ketone | Methylene chloride | Tetrahydrofuran |
|---|---|---|---|---|---|---|---|---|---|---|---|---|---|
| 21 | ABS graft | 5 | 95 | 100 | | | | | | | | | |
| 22 | do | 5 | 95 | 50 | | | | | | | | 50 | |
| 23 | do | 5 | 95 | 50 | | | | | | | | | 50 |
| 24 | do | 5 | 95 | | 100 | | | | | | | | |
| 25 | do | 5 | 95 | | 50 | | | | | | | 50 | |
| 26 | do | 5 | 95 | | 50 | | | | | | | | 50 |
| 27 | do | 5 | 95 | | | 100 | | | | | | | |
| 28 | do | 5 | 95 | | | 50 | | | | | | 50 | |
| 29 | do | 5 | 95 | | | 50 | | | | | | | 50 |
| 30 | do | 5 | 95 | | | | 100 | | | | | | |
| 31 | do | 5 | 95 | | | | 50 | | | | | 50 | |
| 32 | do | 5 | 95 | | | | 50 | | | | | | 50 |
| 33 | do | 5 | 95 | | | | | 100 | | | | | |
| 34 | do | 5 | 95 | | | | | 50 | | | | 50 | |
| 35 | do | 5 | 95 | | | | | 50 | | | | | 50 |
| 36 | do | 5 | 95 | | | | | | 100 | | | | |
| 37 | do | 5 | 95 | | | | | | 50 | | | 50 | |
| 38 | do | 5 | 95 | | | | | | 50 | | | | 50 |
| 39 | do | 5 | 95 | | | | | | | 50 | | 50 | |
| 40 | do | 5 | 95 | | | | | | | 50 | | | 50 |
| 41 | do | 5 | 95 | | | | | | | | 50 | 50 | |
| 42 | do | 5 | 95 | | | | | | | | 50 | | 50 | compositions set forth in Tables 1 and 2 hereinabove. In the examples set forth hereinbelow, those substrates referred to as ABS graft polymer were prepared by polymerizing about 3 parts by weight acrylonitrile and about 50 parts by weight of styrene in the presence of about 20 parts by weight of prepolymerized butadiene.

Examples 2–10 of Table 1 set forth a swelling solvent with the polycarbonate resin. In each case, the film became discontinuous as the solvent was removed therefrom.

Examples 11–20 of Table 1 have illustrated the use of a developing solvent in combination with a true solvent to obtain a discontinuous effect similar to that of Examples 1–10.

Examples 21–42 in Table 2 also illustrate the combining of a developing solvent (all those solvents except methylene chloride and tetrahydrofuran) with a true solvent, namely, methylene chloride and tetrahydrofuran. The surface coating was applied and the solvent was evaporated therefrom to leave a discontinuous coating having an attractive appearance.

It will be understood from the examples that the invention has been described in connection with the utilization of developing solvents, i.e., swelling solvents which may be mixed with true solvents for the polycarbonate. In all cases, a discontinuous surface was obtained. The surface was varied over a wide range of discontinuity, i.e., checked pattern, depending upon the solvent used. As mentioned above, it is necessary that the coating be applied to a thermoplastic substrate; however, the thermoplastic substrate may, in turn, be applied to virtually any substrate such as metal, wood, glass, or other plastic material.

The invention has been described with respect to specific examples, however, the examples are meant to illustrate the invention and are not meant to limit the scope of the invention. The scope of the invention is defined solely by the appended claims which should be construed as broadly as is consistent with the prior art.

What is claimed is:

1. A method of making a discontinuous polycarbonate coating on a thermoplastic substrate comprising the steps of dissolving polycarbonate resin at least two solvents, at least 30% of which is a developing solvent capable of swelling the polycarbonate and the other portion of which is a true solvent, applying the resin-solvent composition to a thermoplastic substrate, driving the solvents from the substrate to thereby provide a discontinuous polycarbonate coating thereon.

2. The method of claim 1 wherein the developing solvent is selected from the group consisting of styrene, substituted styrene, ketones and alcohols and wherein the true solvent is selected from the group consisting of tetrahydrofuran and partially halogenated hydrocarbon.

3. The method of claim 1 wherein the substrate is a thermoplastic polymer, copolymer, or graft polymer prepared from styrene, alphamethylstyrene, acrylonitrile, methacrylonitrile, butadiene, isoprene, or vinyl chloride, polyesters, polysulfones or polyphenylene oxides.

References Cited

UNITED STATES PATENTS

| | | | |
|---|---|---|---|
| 1,408,816 | 3/1922 | McClellan | 117—63 |
| 1,756,010 | 4/1930 | Boughton | 117—63 |
| 3,148,985 | 9/1964 | Ossenbrunner et al. | 117—161 X |
| 3,190,765 | 6/1965 | Yuan | 117—10 X |
| 3,208,875 | 9/1965 | Holden | 117—10 X |
| 3,214,407 | 10/1965 | Butterworth | 117—161 X |
| 3,243,393 | 3/1966 | Barton | 117—161 X |
| 3,304,196 | 2/1967 | Deichert et al. | 117—161 X |

WILLIAM D. MARTIN, Primary Examiner

M. R. PERRONE, Jr., Assistant Examiner

U.S. Cl. X.R.

117—72, 75, 138.8 A, B, C, 161 UE, R; 161—183